United States Patent [19]
Allaire

[11] 3,964,361
[45] June 22, 1976

[54] MITER TABLE ASSEMBLY

[76] Inventor: Joseph Paul Allaire, 228 NE. 22nd Ave. Apt. 4, Pompano Beach, Fla. 33062

[22] Filed: July 30, 1975

[21] Appl. No.: 600,291

[52] U.S. Cl. ................................. 83/471.3; 83/473; 83/477.2
[51] Int. Cl.² .......................................... B27B 9/04
[58] Field of Search ............... 83/471.3, 485, 477.2, 83/473

[56] References Cited
UNITED STATES PATENTS

| | | | |
|---|---|---|---|
| 3,741,063 | 6/1973 | Bretthauer | 83/471.3 X |
| 3,802,472 | 4/1974 | Morse | 83/477.2 X |
| 3,821,915 | 7/1974 | Larrable | 83/477.2 X |

Primary Examiner—Frank T. Yost

[57] ABSTRACT

A miter table assembly adapted to produce miter cuts with a power saw, such as a circular handsaw, and which is particularly adapted to be safe to operate and readily collapsible for easy transportation from one job site to another. This miter table assembly comprises a table top, hollow legs pivoted to the table top, bars or struts each removably engaging a pair of legs to hold the same in operative position and stowable in a hollow leg for transportation, an elongated base with a channel extending transversely thereof, a guide frame pivoting on top of the elongated base about an upright pivot axis, defining a straight slot upwardly registering with the transverse channel and adapted to slidably support and guide a power handsaw, stopping devices secured to the guide frame to prevent falling of the saw at either end of the slot and allowing selective removal of the saw, and clamping levers on opposite sides of the channel and of the base to clamp both cut pieces of work on either side of the base.

10 Claims, 11 Drawing Figures

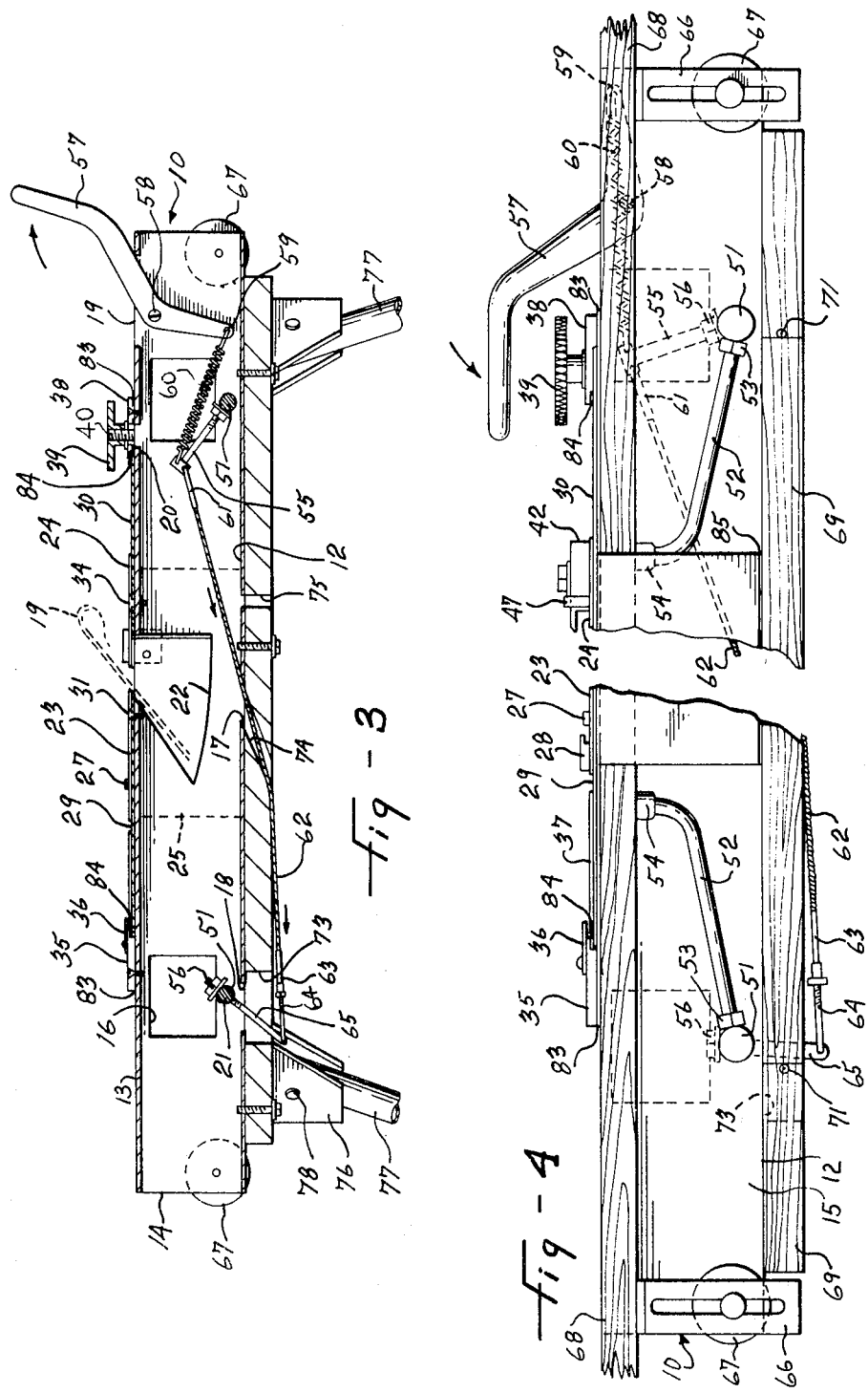

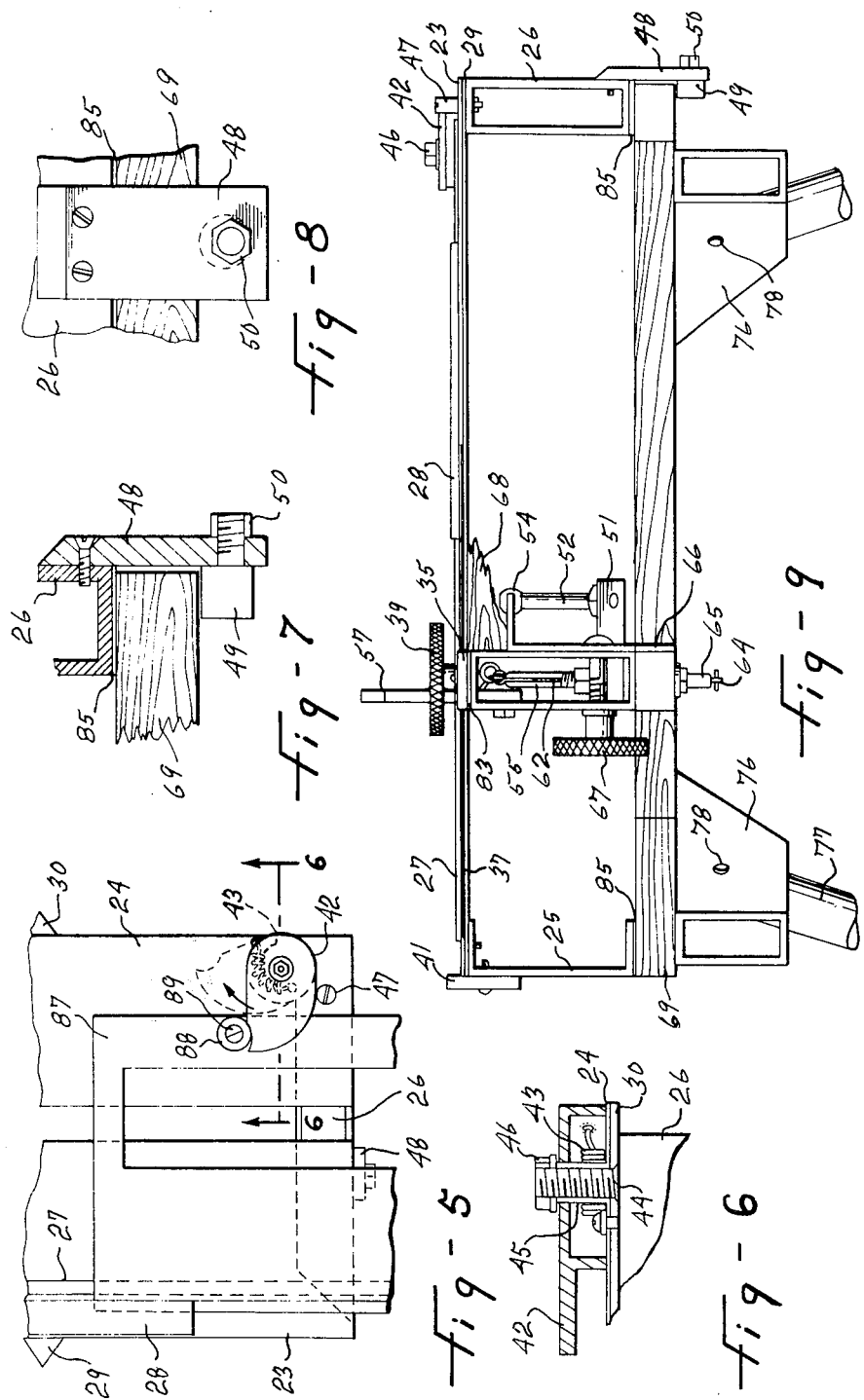

MITER TABLE ASSEMBLY

This invention relates to an accessory for a power handsaw and, more particularly, to a miter table assembly of the type adapted to produce miter cuts with a power handsaw.

The miter table assemblies of the above type which have so far been proposed for power-operated saws, such as the well known rotary handsaws, lack versatility and security particularly in relation to the displacement and adjustment of the saw relative to the piece of work to be cut. For instance, the anterior miter table assemblies are not specifically adapted to safely carry the saw nor to hold the cut pieces of work on opposite sides respectively of the line of cut.

My previous U.S. Pat. Nos. 3,742,803, issued on July 3, 1973, and 3,815,463, issued on June 11, 1974, and Canadian Pat. Nos. 938,863, issued on Dec. 25, 1973 and 949,854, issued on June 25, 1974, define a miter table assembly which has been given more versatility as compared to the similar prior art assemblies. This has been done in particular by forming a transverse channel for unobstructed passage of the saw through each side of the base and by providing for clamping the pieces of work on either side of the elongated base.

However, the Applicant has observed that his aforementioned miter table assemblies may be further improved for safer, even more versatile and simple use and particularly for more convenience in transportation from one job site to another.

It is a general object of the invention to provide a miter table assembly for a power handsaw which is versatile, safer and relatively simple to use, and convenient for transportation from one job site to another.

It is a more specific object of the invention to provide a miter table assembly of the above type, wherein the miter cuts are made along a transverse channel by sliding of the saw on a guide frame which is pivoted about an upright axis extending through the channel and which includes locking devices arranged to prevent accidental dropping of the saw off the miter table assembly.

It is a further object of the invention to provide a miter table assembly for a power saw which includes a table and flexible legs connected to the table and adapted to be easily portable with the latter for convenient use by a carpenter going from one job to another and, in particular, which includes two removable bars or struts to keep the legs in operative spread-apart position for safe cutting operation.

The invention will now be described in detail with reference to a preferred embodiment of the miter table assembly which is illustrated by way of example in the accompanying drawings, in which:

FIG. 3 is a cross-sectional view as seen along line 3—3 in FIG. 2;

FIG. 4 is an enlarged scale partial view of FIG. 1, particularly illustrating a clamping assembly for the pieces of work;

FIG. 5 is an enlarged scale partial view particularly illustrating a locking device for the saw;

FIG. 6 is a cross-sectional view as seen along line 6—6 in FIG. 5;

FIG. 7 is a cross-sectional view of a stability assembly for the miter table assembly;

FIG. 8 is a front elevation view of the stability assembly as seen from the right in FIG. 7;

FIG. 9 is an end view of the miter table assembly as seen from the left in FIGS. 1 and 3;

Figure 1:
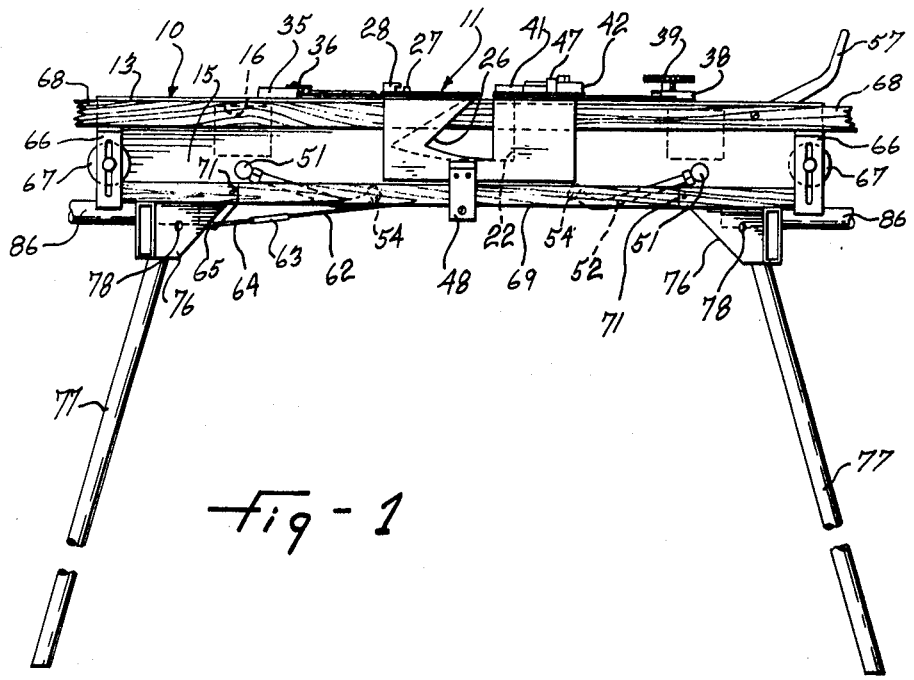
FIG. 1 is an elevation view of a miter table assembly according to the present invention.

The illustrated miter table assembly includes a supporting elongated base 10 and a power handsaw guiding frame 11.

The base includes an elongated hollow housing having bottom, top and side walls 12, 13, 14, and 15 respectively; openings 16 in the side wall 14; an inclined hole 17 and a rectangular opening 18 in the bottom wall 12, a narrow rectangular opening 19 and a small square opening 20 in the top wall 13, four circular openings 21 through walls 14 and 15; and apertures 22 transversely aligned to form a transverse channel or passage through the elongated base. The transverse passage and, other words, the apertures 22 are shaped to allow the usual miter cuts including combinations of angular and inclined cuts 91.

The frame 11, which slidably supports the portable power saw, is pivoted about an upright axis upwardly extending through the afore-mentioned transverse channel defined by the apertures 22. The frame 11 includes a pair of flat supporting fiber strips 23 and 24 which are held parallel to each other by a U-shaped member 25 at the rear and a transverse rectangular tube member 26 formed with an aperture therethrough arranged in transverse alignment with the abovementioned apertures 22 and slightly narrower than the latter. The apertures of 26, like the apertures 22, upwardly taper from an arc-shaped bottom edge.

Figure 2:
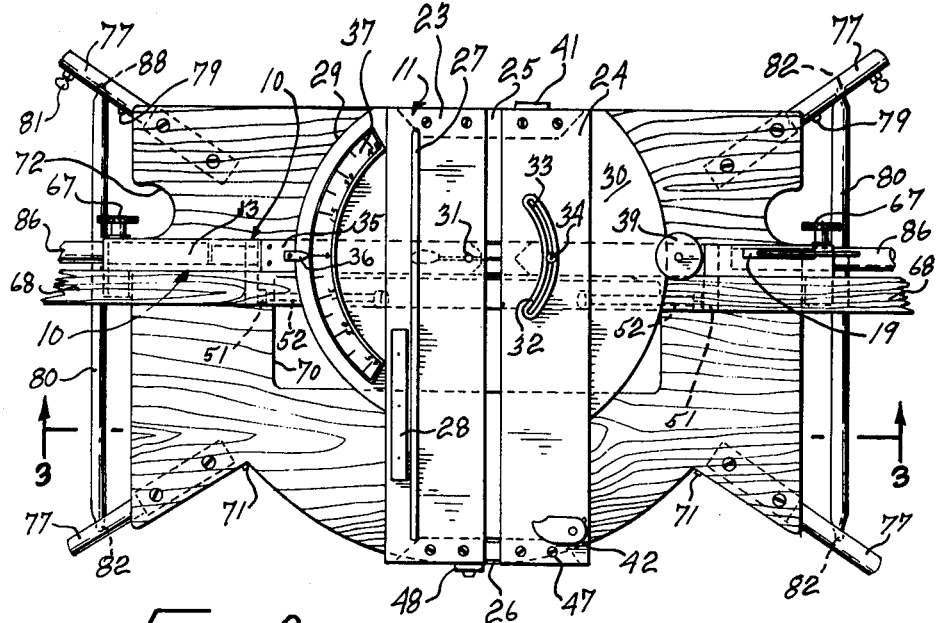
FIG. 2 is a top plan view of the miter table assembly of FIG. 1.

A guiding metal strip 27 is secured onto the supporting strip 23 adjacent the outer edge thereof. A safety guide 28 is secured onto the supporting strip 23 adjacent the outer edge thereof and serves to keep the power saw in position. As shown in FIGS. 2 and 3, the supporting strip 23, on the left, is secured at its opposite ends to a segment-shaped plate 29 for bodily rotation with the latter. Another segment-shaped plate 30 is secured against the outer edge of the strip 24. Both plates 29 and 30 are bodily pivoted by a screw 31 located in the middle of the miter assembly. This screw 31 has a conic form; is fitted in supporting strip 23, through plate 29; threaded into the top wall 13 at the base 10; and secured by a hex nut. (See FIG. 3).

An arc-shaped opening 32 is formed in the supporting strip 24 coaxial with the axis of rotation of the screw 31 and an arc-shaped opening 33 is formed in the plate 30 in registry with the opening 32, but is slightly narrower than the latter. A screw 34, purposely headed to fit evenly into strip 24 and through plate 30, extends through the top wall 13 and is secured by a hex nut. The use of the screw 34 is to reinforce the frame 11, as seen in FIGS. 2 and 3.

Adjacent the arc-shaped outer edge of the segment plate 29, a guide member 35 is screwed onto the top wall 13 of the base 10 and is provided with a flange overlying this outer edge of plate 29 in frictional engagement therewith. An indicator 36 is screwed on the top of guide member 35. An arc-shaped indicator strip 37 is secured onto the segment-shaped plate 29 to select the desired angles. At the right of the segment-shaped plate 30, a guide member 38 is also screwed onto the top wall 13 and is provided with a lateral flange, or extension, which frictionally engages and overlies the outer edge of the plate 30. A knob 39 extends through member 38 and top wall 13 and is held by a carriage bolt 40 to loosen or tighten the frame 11 after selection of the desired angle. The segment-shaped plates 29 and 30 retain the frame 11 to ensure proper position of the strip 27 at the desired angles with respect to the base, to allow projection of the saw blade 91 into the transverse channel and lengthwise moving along the latter.

Thus, the angular position of the frame 11 may be selectively set to produce the desired miter cuts and the apertures 22 and 26 are of such width to allow free or unobstructed passage of the saw blade from one end to the other of the guide strips 23 and 24, stopping at member 41 to avoid the power saw sliding out of guiding strips 23 and 24.

To ensure that the power saw does not either come out at the front, a stop member 42 is pivoted at the front end of strip 24 and is connected at its underside by a spring 43 which is secured at one end to plates 24 and 30 of frame 11 and is welded at the other end to the afore-mentioned member 42, as seen in FIG. 6. A bolt 44 extends through the stop member 42, is threaded into the frame 11 and is inserted in a sleeve 45 which rests on strip 24. On top of the sleeve, there is a washer tightened by hex nut 46. That way, the pivotable stop member 42 is always from. A post screw 47 is secured to frame 11 and member 26 for abutment of the stop member 42 when it comes back automatically to its inoperative or rest position. A lock 88 is provided on the right front end of the power saw base plate 87; is made of rubber on the outside; and is secured to the base plate by a special screw 89. By pivoting manually the member 42 in the direction of the arrow in FIG. 5, the base plate of the power saw is easily insertable on the frame 11 and removable from the latter. As shown, the lock 88 operatively abuts against the semi-circular notch of member 42 and prevents the portable power saw to come out at the front end of the miter table assembly.

A member 48 is provided to give more stability to frame 11 and table assembly 69 respectively. This member 48 is secured to member 26 and has an uncentered bolt 49 which allows adjustment with the table assembly and the frame 11 and is tightened by a hex nut 50, as seen in FIGS. 7 and 8.

To ensure free rotation of frame 11, two pieces of fiber 83 are glued on the top wall 13 of the base 10. One extends from guide member 35 to the right end of the guide member 38. This piece of fiber is divided in two parts, because of the transverse channel. One piece of fiber 84 is also glued under the flange of the two guide members 35 and 38. One piece of fiber 85 is glued under the members 25 and 26. The two supporting strips 23 and 24 are also made of fiber to facilitate sliding of the power saw. (See FIGS. 4 and 9)

For the cutting operation, the piece of work 68, such as a strip of wood or a moulding, must be held against the underside of the frame 11 and the outer face of the side wall 15. A work holding, or clamping device, is provided for that purpose which is arranged to form another means of holding the frame 11 in desired angular relation to the base 10.

The illustrated clamping device, or assembly, includes a pair of pivot bars 51 extending transversely through the walls 14 and 15 adjacent the bottom edge thereof and on opposite sides respectively of the transverse channel defined by the apertures 22. A pair of clamping arms 52, held on the pivot bars by nuts 53, extend radially and forwardly and have rubber tips 54 at the free end thereof arranged to engage upwardly against the underside of the piece of work 68 to hold the latter tight against the underside of the segment-shaped plates 29 and 30.

Inside the base 10, the pivot bar 51 at the right end is provided with a lever T post 55 secured thereto with a washer and a nut 56. A manual lever, or handle 57, is pivoted about an axis 58 extending transversely through the base 10 and projects outwardly of the latter through the slot 19 in the top wall 13. The inner end of the handle 57 is provided with a screw 59 to which is pivotally secured a tension spring 60 joined at the other end to the upper end of the lever T post 55. A hook 61 is fixed to the upper end of the lever T post 55 and inside the hook member 61; a tiny steel cable 62 is welded going downward through openings 17 and 74 and has its other end welded in member 63, which is adjustable with a threaded hook 64 attached to the bottom of a post 65 extending upward through openings 73 and 18 and secured to pivot bar 51 by a washer and nut 56. The spring 60 allows yieldable engagement of the clamping tips 54 to account for pieces of work of different thicknesses. As may be seen in FIG. 4, the inner end of the handle 57 and the tension spring 60 are arranged to form a toggle linkage to hold the handle 57 in clamping position. The work 68 may be simply removed and released from either side of channel 22 of side wall 15 of the base 10, by pulling on the manual level 57 in the direction of the arrow (see FIGS. 1, 3, and 4). As may be seen from a comparison of FIGS. 3 and 4, the pivoting of the handle 57 towards the frame 11 causes a pulling and extending of the spring 60 and a pivoting of the clamping arms 52 with a resulting engagement of the rubber tips 54 against a piece of work 68 placed in a cutting position along wall 15 of the base 10.

A pair of vertically adjustable angle aluminum supports 66 are located at both ends of side wall 15 of the base 10 providing handles and bolts 67 at the opposite sides respectively to keep their positions and to carry the work 68 and prevent sagging thereof (see FIGS. 4 and 9).

A table top 69, of any appropriate outline form, has the base 10 secured thereon to be carried therewith. Table top 69 has a rectangular shape opening 70 centered with axis 31 and relative to apertures 22. Cut pieces freely fall through this opening 70. The front table top 69 is formed with an arc-shaped peripheral portion arranged coaxial with the axis 31. Both end corners of the arc-shaped portion of table 69 have each an adjustable screw 71 which allows to instantly find a 45° cut by pivoting frame 11 against abutment of member 48 therewith. Table 69 has two openings 72 behind side wall 14 of the base 10 to form a free way to tighten or loosen knobs 67. Table 69 has a square opening 73 for the post 65, and inclined opening 74 for the cable 62, and an opening 75 forming an access to tighten special screw 34. Brackets 76 are secured against the underside of the table 69 and legs 77 are flexibly pivoted to the brackets 76 maintained with bolts and nuts 78 respectively to allow folding of the legs against the underside of the table 69 for covenience in transportation of the miter table assembly from one job site to another. As seen in FIG. 2, the two rear legs have a pin 79 to stop bars 80 from going any farther when they are stowed inside these two legs for transportation and locked by a thumb screw 81 respectively. When the miter table assembly is ready for use, the two bars 80 are inserted in the openings 82, preventing accidental folding of the same during operation.

An extension including a boom 86 can be arranged to be attached in any suitable way underneath the table 69 in the center of the base 10 to project therefrom in the directions of the outer ends of the latter. The outer ends of the extensions form a stand to support the piece of works 69.

Figure 10:
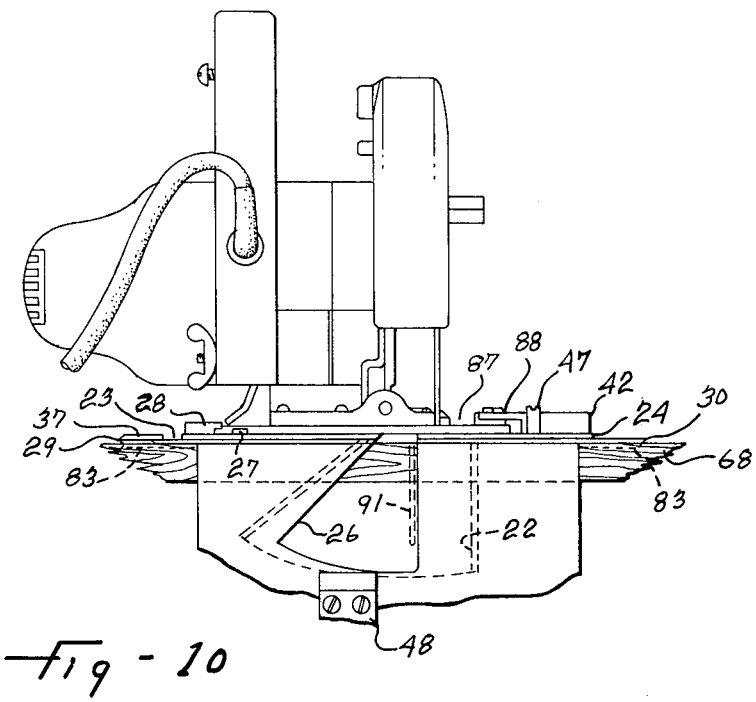
FIG. 10 is an enlarged scale partial view of FIG. 1 illustrating a power handsaw in operative position on the guide frame.
Figure 11:
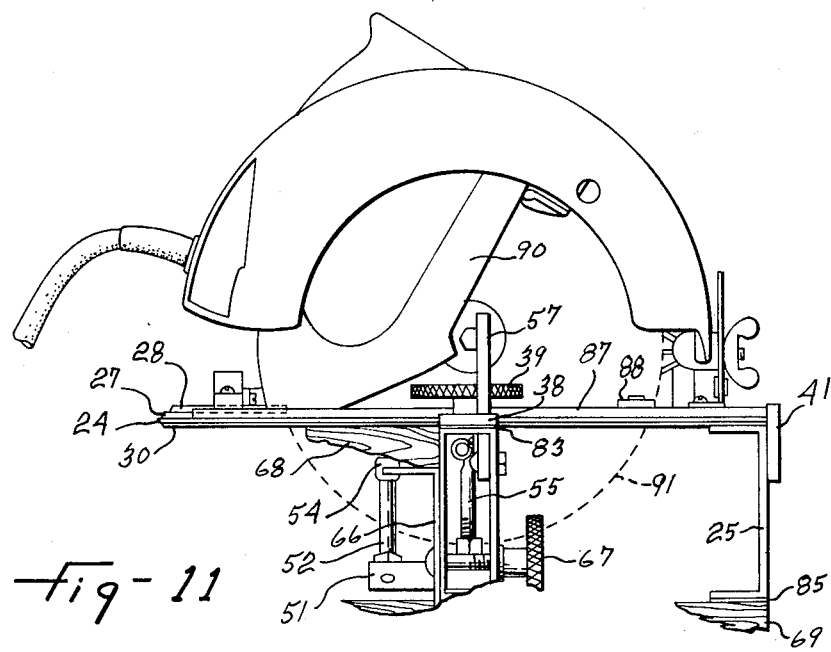
FIG. 11 is a partial end view of the miter table assembly as seen from the right in FIGS. 1 and 3 with the portable power handsaw thereon.

The illustrated base plate of the power saw 87 has been made especially to be adapted on the aforedescribed miter table assembly. It slides easily on their respective guides. A rubber stop 88, secured with a special screw 89 on the right side of the base plate, stops the latter against the stop member 42 to avoid sliding out of the power saw (see FIGS. 5 and 10). This base plate can be adapted on any other plain surface, too.

When not provided with the power saw, a security guard 90 is added to the latter. When cutting straight or angular cuts with this extra guard 90, it will be ensured that this guard will always rest on the frame 11 while going back and forth, and close only when removing the saw from the miter table assembly.

It will be easily understood, at least by persons skilled in the art, that the illustrated and afore-described embodiment defines many details of construction which may be modified while remaining within the principle and scope of the invention defined by the appended claims.

What I claim is:

1. A miter table assembly for a portable power-operated saw comprising a table top, an elongated base secured over said table top and having a channel extending transversely through said base and also opening upwardly thereof, a guide frame supported on top of said elongated base, pivotably relative thereto about an upright pivot axis, defining a straight slot upwardly registering with said channel, and adapted to support and guide a portable power handsaw with the blade of the latter in downward projection into said slot and said transverse channel, for operative guided displacement of the saw from one end to the other of said guide frame, a pair of stopping devices secured to said guide frame at relatively opposite ends respectively of said straight slot, one of said stopping devices being fixedly secured in the path of displacement of the base plate of the portable power handsaw and the other of said stopping devices including an arm pivoted to said guide frame and a spring connected to said arm and pivotably biasing the latter toward and in the path of the power handsaw and in overlying relationship with the base plate of the latter.

2. A miter table assembly as defined in claim 1, wherein said base plate is provided with a top projection at one end thereof engageable with said pivoted arm and said guide frame includes a fixed abutment engageable by the pivoted arm under the bias of said spring.

3. A miter table assembly as defined in claim 2, wherein said pivoted arm is pivotable against the bias of said spring laterally clear of the base plate of the saw for selective removal of the latter from the guide frame.

4. A miter table assembly as defined in claim 1, further including legs pivotally connected to said table top and collapsibly supporting the same, and removable struts transversely coupling each a pair of said legs and holding the latter in operative spreaded-apart relationship against accidental collapse relative to the table top.

5. A miter table assembly as defined in claim 4, wherein at least some of said legs are hollow and said struts are inoperatively stowable inside said hollow legs.

6. A miter table assembly as defined in claim 5, further including setscrews secured to the hollow legs and releasably holding the struts in the latter.

7. A miter table assembly as defined in claim 1, further including a work clamping assembly including a pair of clamping levers pivoted about a pair of transverse axes on opposite sides respectively of said channel and positioned to engage against the underside of a piece of work operatively positioned relative to the elongated base, a manual lever pivoted to said base about a transverse axis relative to the latter, a tension spring connected to one of said clamping levers and to said manual lever and forming a toggle linkage with the latter and a link interconnecting said clamping levers for concurrent operative pivoting thereof.

8. A miter table assembly as defined in claim 7, further including a pair of pivots transversely extending through said elongated base on opposite sides of said channel respectively, said clamping levers being secured to said transverse pivots respectively to bodily pivot therewith on one side of said elongated base, and another pair of clamping levers secured to said transverse pivots respectively on the other side of said elongated base for clamping of a piece of work on either side of the latter.

9. A miter table assembly as defined in claim 1, wherein said table top is provided with a pair of abutments fixed at 45° angles on opposite sides respectively of said channel and relative to the latter.

10. A miter table assembly as defined in claim 3, further including legs pivotally connected to said table top and collapsibly supporting the same, removable struts transversely coupling each a pair of said legs and holding the latter in operative spreaded-apart relationship against accidental collapse relative to the table top, at least some of said legs being hollow and said struts being inoperatively stowable inside said hollow legs, setscrews secured to the hollow legs and releasably holding the struts in the latter, a work clamping assembly including a pair of clamping levers pivoted about a pair of transverse axes on opposite sides respectively of said channel and positioned to engage against the underside of a piece of work operatively positiond relative to the elongated base, a manual lever pivoted to said base about a transverse axis relative to the latter, a tension spring connected to one of said clamping levers and to said manual lever and forming a toggle linkage with the latter, a link interconnecting said clamping levers for concurrent operative pivoting thereof, a pair of pivots transversely extending through said elongated base on opposite sides of said channel respectively, said clamping levers being secured to said transverse pivots respectively to bodily pivot therewith on one side of said elongated base, another pair of clamping levers secured to said transverse pivots respectively on the other side of said elongated base for clamping of a piece of work on either side of the latter, and said table top being provided with a pair of abutments fixed at 45° angles on opposite sides respectively of said channel and relative to the latter.

* * * * *